Jan. 13, 1925.

G. D. RATLIFF 1,522,545

WRAPPING MACHINE

Filed Jan. 25, 1923

INVENTOR.
George D. Ratliff
BY
Cyrus N. Anderson
ATTORNEY.

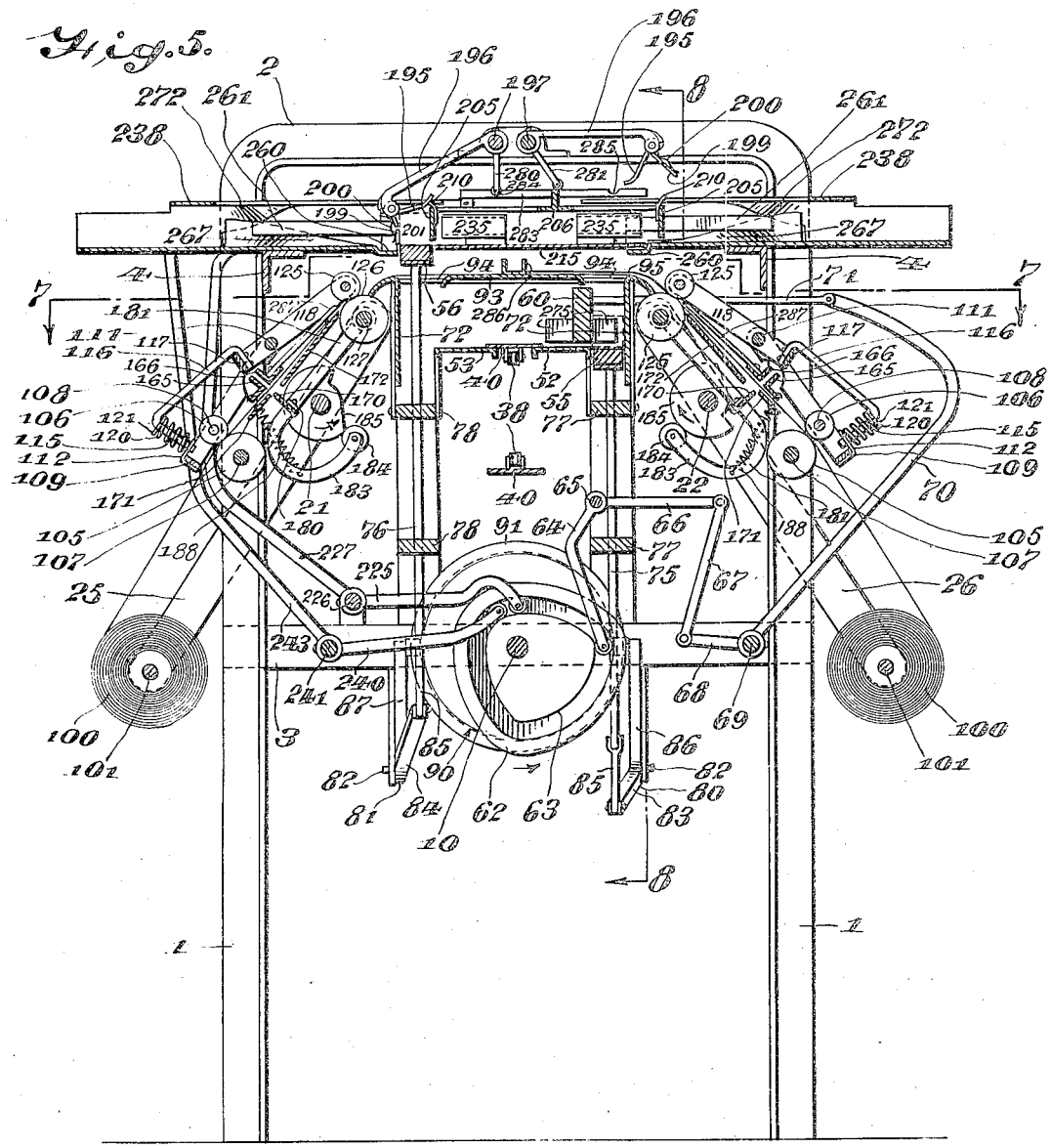
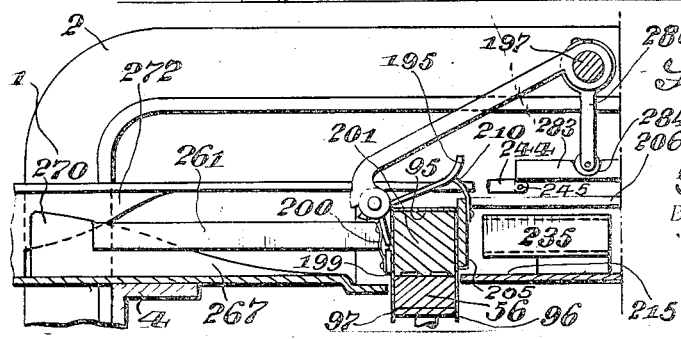

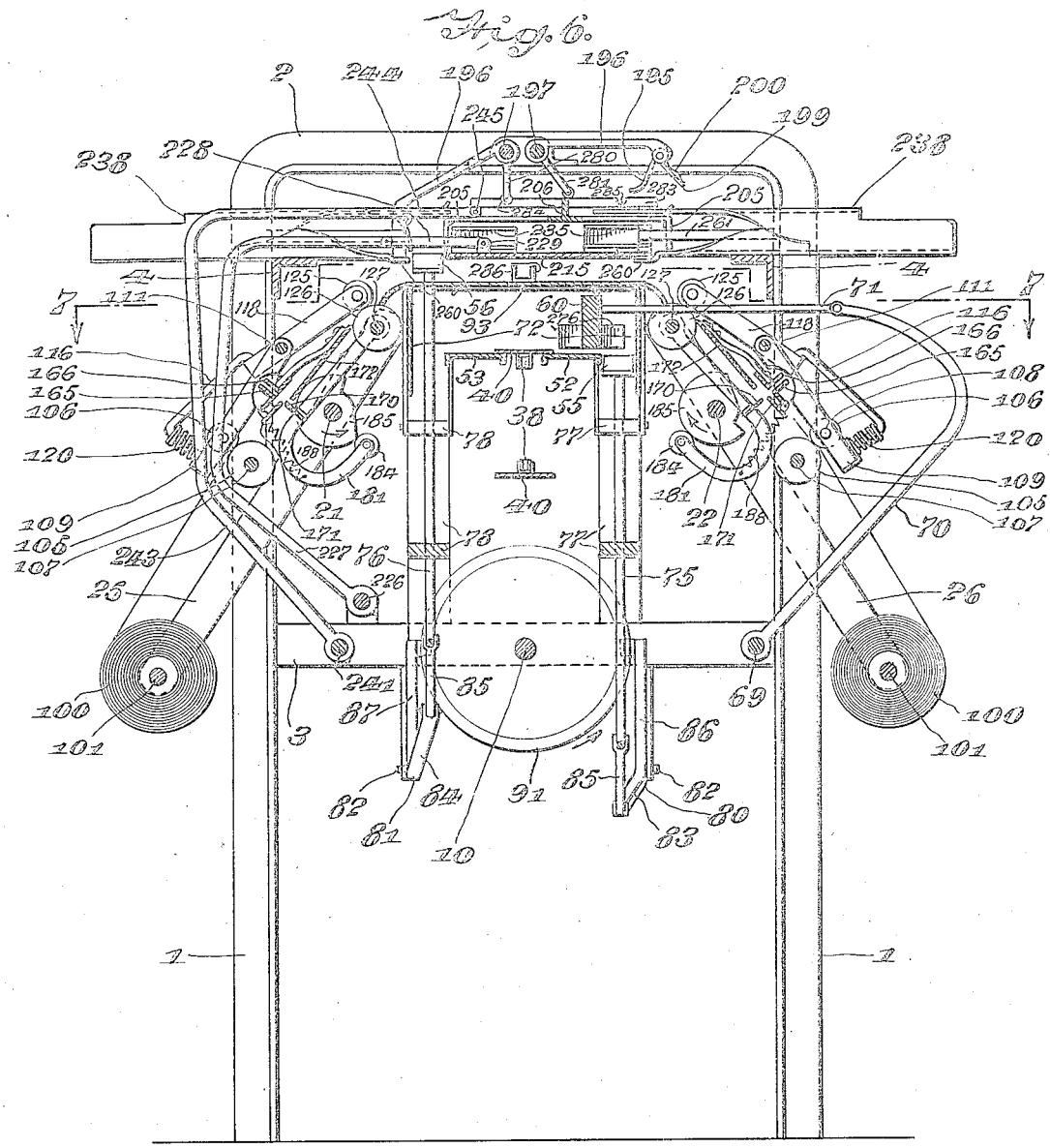

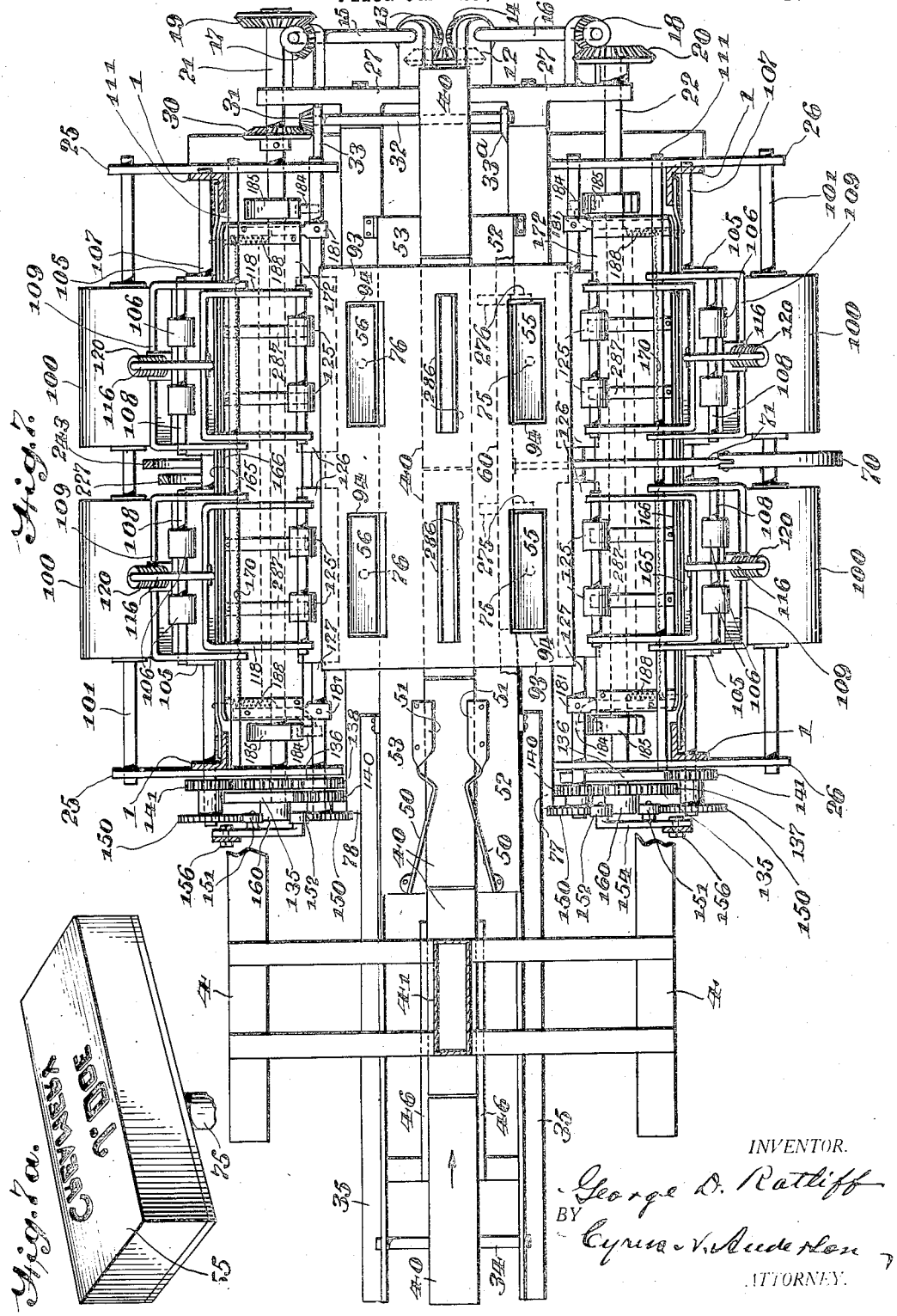

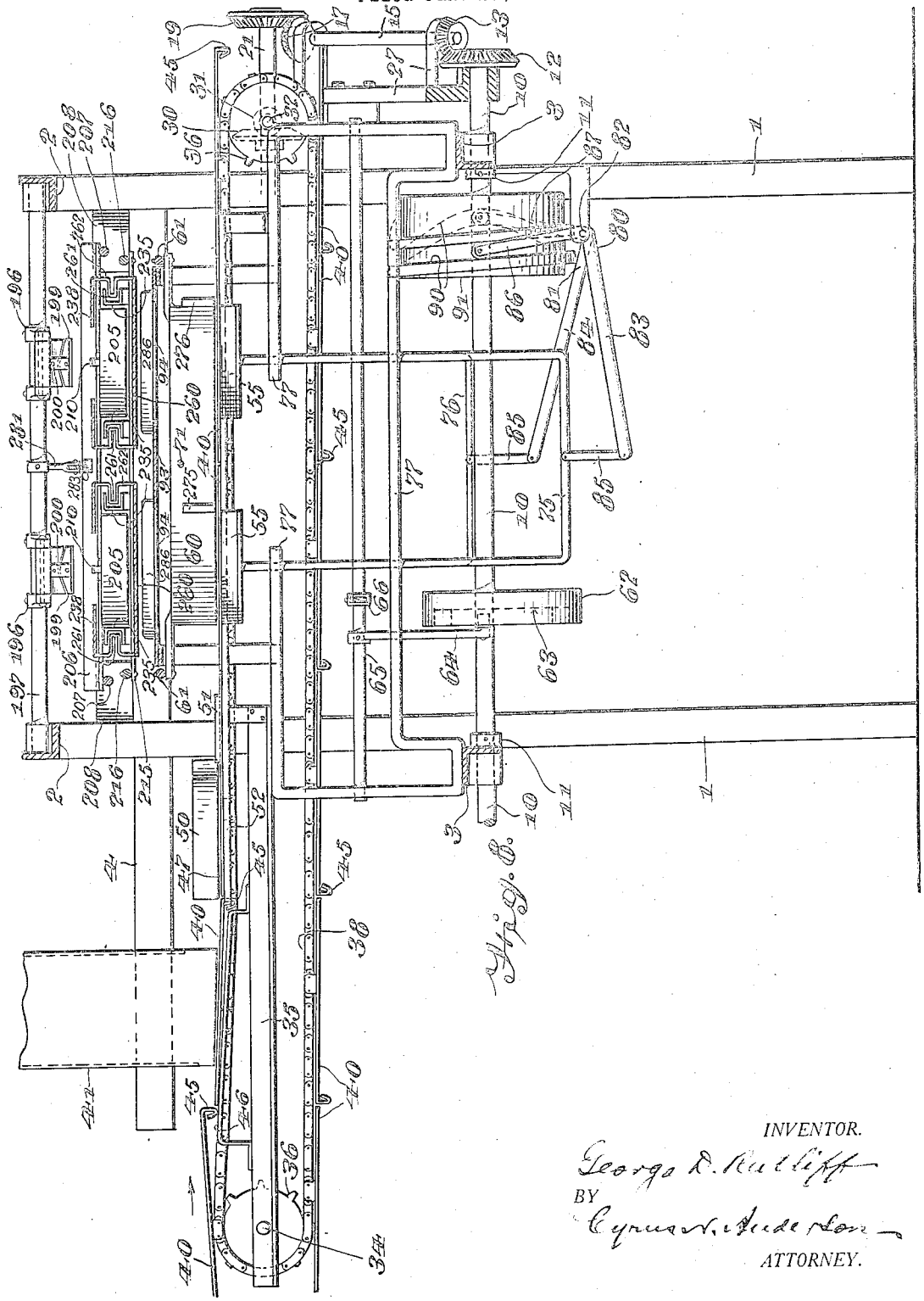

Jan. 13, 1925.                                                                1,522,545
G. D. RATLIFF
WRAPPING MACHINE
Filed Jan. 25, 1923        9 Sheets-Sheet 9
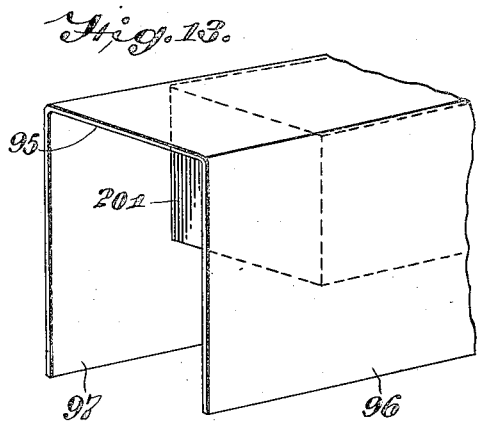
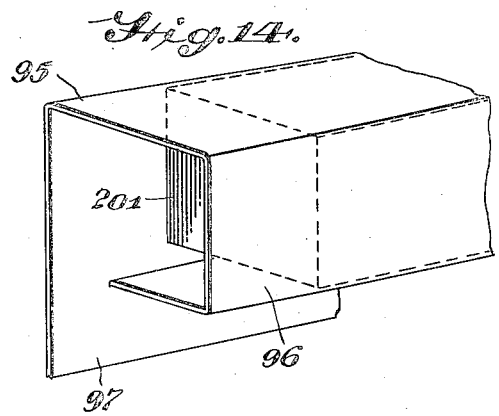
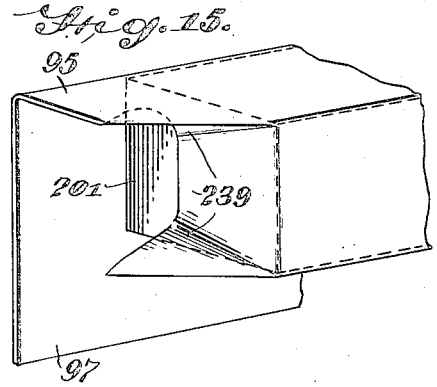
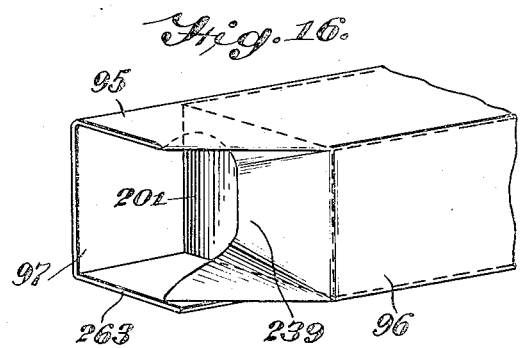
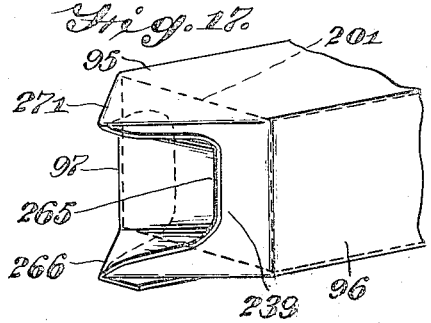
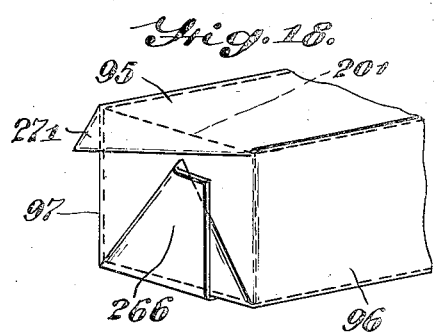
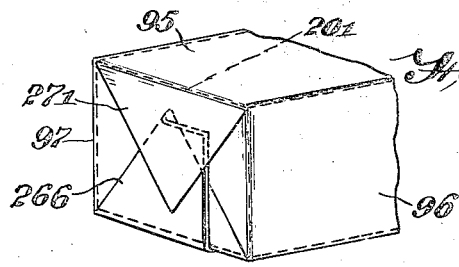
INVENTOR.
George D. Ratliff
BY
Cyrus N. Anderson
ATTORNEY.

Patented Jan. 13, 1925.

1,522,545

UNITED STATES PATENT OFFICE.

GEORGE D. RATLIFF, OF CLINTON, MISSISSIPPI.

WRAPPING MACHINE.

Application filed January 25, 1923. Serial No. 614,728.

*To all whom it may concern:*

Be it known that I, GEORGE D. RATLIFF, a citizen of the United States, and a resident of Clinton, in the county of Hinds and State of Mississippi, have invented an Improvement in Wrapping Machines, of which the following is a specification.

My invention relates to wrapping machines which are adapted to be employed in the wrapping of packages of various kinds and sizes, particularly relatively large articles weighing say not less than one quarter of a pound and from that size on up to packages of the size of a loaf of bread, corn flake packages, etc. It is to be understood, however, that the principle embodied in my invention is not to be limited to machines employed only in the wrapping of large articles. The principle of my invention may be embodied in machines adapted to be employed in and for the wrapping of small articles as well.

The general object of my invention is to provide a machine of the character indicated which is relatively simple in construction and which, therefore, may be economically manufactured; and it is also an object of my invention to provide a machine which may be operated efficiently with the expenditure of a relatively small amount of power which is an accomplishment of great advantage.

A further object of my invention is to provide means whereby a couple of articles to be wrapped may be delivered alternately first upon one side and then upon the opposite side of the machine and wrapped simultaneously.

A still further object of my invention is to provide means for automatically supplying wrapping paper upon opposite sides of the machine to the respective articles to be wrapped and for severing portions thereof sufficient to enfold or wrap the said articles.

A still further object of my invention is to provide a novel construction of means for folding the wrappers around the objects being wrapped.

Other objects and advantages of my invention will be pointed out in the detailed description thereof which follows or will be apparent from such description.

In order that the invention may be readily understood and its practical advantages fully appreciated reference may be had to the accompanying drawings in which I have illustrated one form of embodiment thereof. However, it will be understood that the invention is susceptible of embodiment in other forms of construction than that shown and that various changes in the details of construction may be made within the scope of the claims without departing from my invention.

In the drawings:

Fig. 4 is a view in elevation of the opposite end of the said machine;

Fig. 5 is a transvere sectional view taken on the line 5—5 of Fig. 1;

Figure 1:
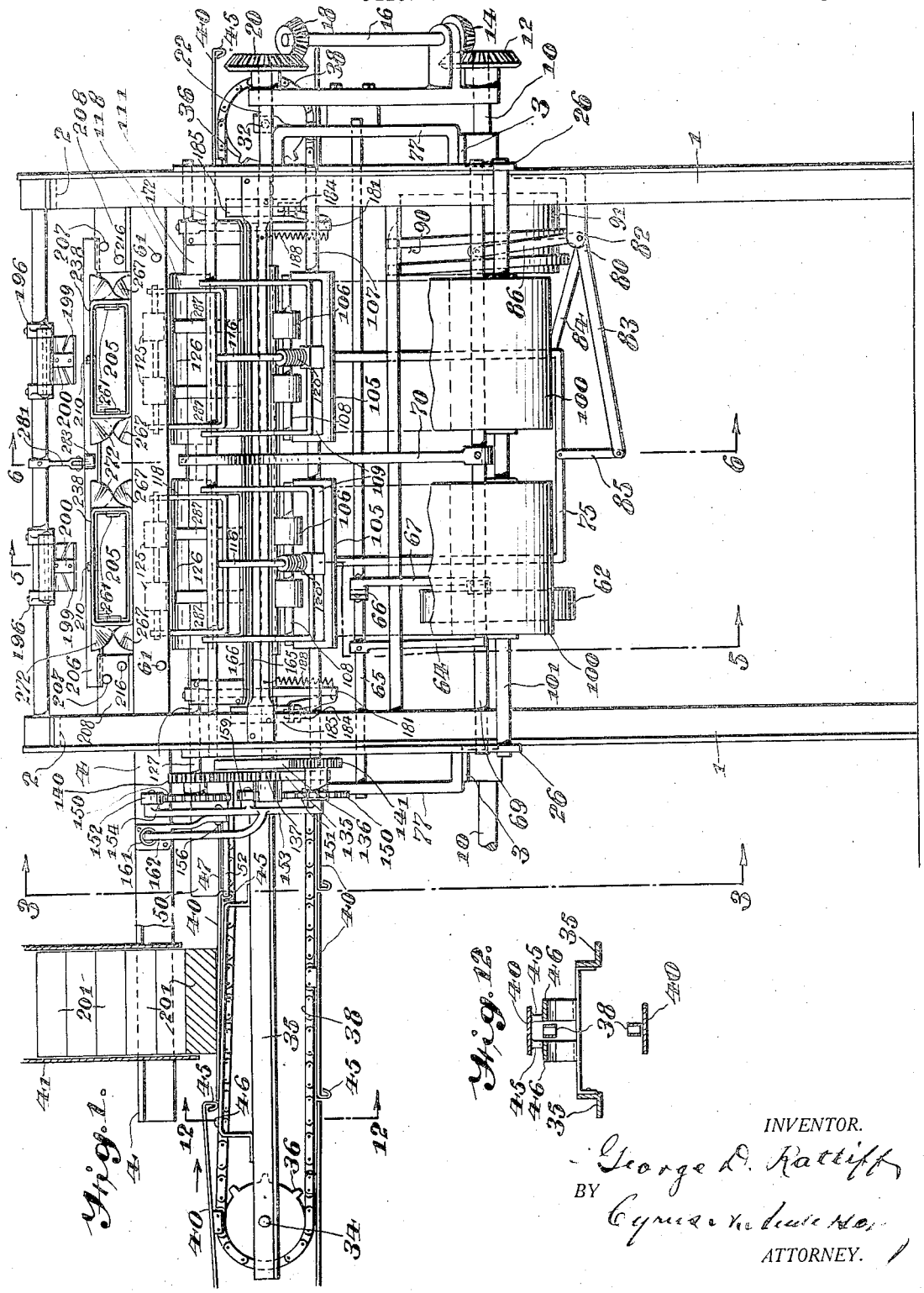
Fig. 1 is a view in elevation of one side of the machine.
Figure 2:
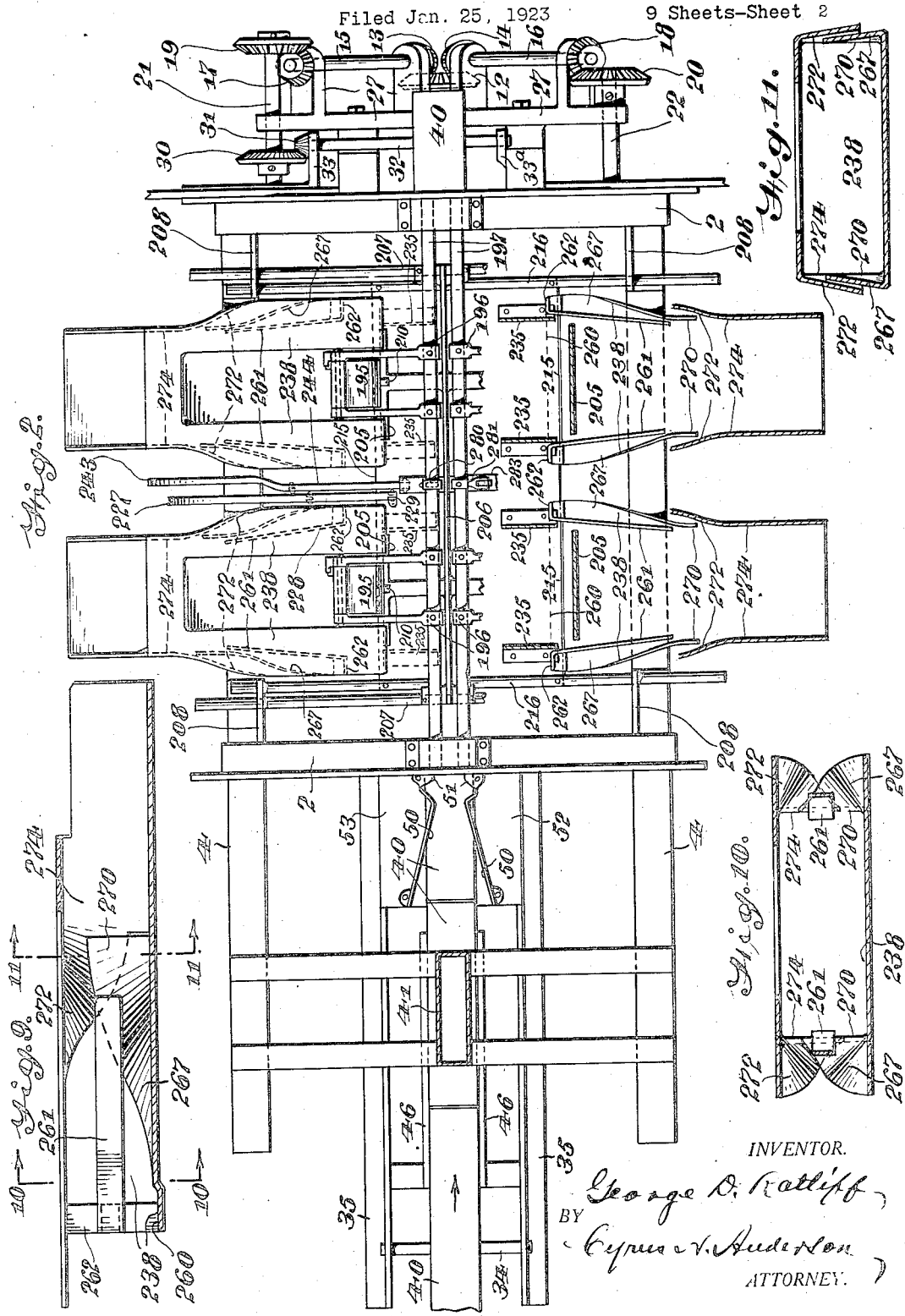
Fig. 2 is a view partly in top plan and partly in horizontal section.

Fig. 5$^a$ is a sectional view enlarged of a fragmentary portion of the machine showing more clearly certain details of construction;

Fig. 6 is a transverse sectional view taken on the line 6—6 of Fig. 1;

Fig. 7 is a horizontal sectional view taken on the line 7—7 of Figs. 5 and 6;

Fig. 7$^a$ is an enlarged perspective of one of the elevators provided with combined holding and marking means;

Fig 8 is a longitudinal vertical sectional view taken on the line 8—8 of Fig. 5;

Fig. 9 is a vertical longitudinal sectional view of a delivery and folding chute;

Fig 10 is a transverse sectional view taken on the line 10—10 of Fig. 9;

Fig. 11 is a transverse sectional view taken on the line 11—11 of Fig. 9;

Fig. 12 is a transverse sectional view taken on the line 12—12 of Fig. 1; and

Figs. 13 to 19 inclusive are views in perspective of one end portion of a package rectangular in cross-section showing the successive steps of the wrapping process effected by the wrapping mechanism of the machine embodying my invention.

Referring to the drawings: 1 designates the supporting legs of the frame which are situated at the opposite ends of the machine, the tops of each pair of which are connected, in the construction shown, by an integral cross-bar 2. The legs are also connected at points intermediate their ends by means of angle-bars 3. The legs at the opposite sides of the machine are connected together by means of angle plates or other bars 4.

The main driving shaft 10 of the machine is rotatably supported in bearings upon the cross-bars 3 and is held against longitudinal displacement by means of collars 11 thereon situated inside of and adjacent to or in contact with the vertical flanges of the angle-bars 3, previously referred to. Any suitable means, not shown, may be employed for driving the shaft 10. The shaft 10 is provided at one end with a beveled gear 12 which is in engagement with beveled gears 13 and 14 secured to the lower ends of shafts 15 and 16 which extend upwardly and divergently toward the opposite sides of the machine. The upper ends of these shafts are provided with beveled gears 19 and 20 upon horizontal shafts 21 and 22 situated near the opposite sides of the machine and which extend longitudinally thereof. These shafts 21 and 22 are mounted adjacent their opposite ends in bearings in bracket bars 25 and 26. The shafts 15 and 16 are supported in bearings upon an angular bracket 27 supported upon the frame of the machine.

The shaft 21 is provided a short distance from the beveled gear 19 with a beveled gear 30 which is in engagement with a beveled pinion 31 upon the adjacent end of a horizontal and transversely extending shaft 32 supported in bearings upon brackets 33 and 33ª. A shaft 34 corresponding to the shaft 32 and in parallel relation thereto is supported at the opposite end of the machine upon outwardly extending projecting bars 35. Sprocket wheels 36 are mounted upon these shafts 32 and 34 upon which wheels an endless conveyor or sprocket chain 38 is supported.

Power may be applied in any suitable or desired manner, either manually or otherwise, to the shaft 10 to drive the same. Upon the driving of said shaft the shafts 21 and 22 are driven through the shafts 15 and 16 and through the shaft 21 the shafts 32 and 34 are driven to drive the endless sprocket chain 38.

The sprocket chain is provided at intervals with carrier plates 40 upon which the objects to be wrapped are deposited after which they are conveyed into the machine into proper relation with respect to the wrapping mechanism to be hereinafter described.

The supplying of the articles to be wrapped to the carrier plates may be effected in any suitable manner, but I have indicated a simple means to that end consisting of a hopper 41 situated directly above the path of travel of the upper portion of the chain and the lower end of which is open. The articles are placed in this hopper or receptacle, one upon the other, and the lowermost of the said articles rests upon and is supported by the said chain, the lower end of the said hopper or receptacle being open. The forward end of each of the carrier plates contacts with an outer end or side of the object to be wrapped and pushes the same forward from underneath the pile of objects within the said receptacle or hopper. In order to cause the forward ends of the carrier plates to contact with the said articles I have provided the said carrier plates at their forward ends with downwardly extending projections 45 which are spaced from each other and which are adapted to contact with the parallel bars 46 which are supported upon the outwardly projecting bars 35 and extend longitudinally thereof. These bars 46 are spaced from each other and the upper span of the sprocket chain travels through the said space and between the said bars. The projections 45 contact with the upper sides of these bars so that the forward end of each of the said carrier plates as they are carried forward is elevated above the adjacent rear end of the next preceding plate, as is shown in Fig. 1 of the drawings. The adjacent front and rear ends of the adjacent plates remain in such relationship to each other until after the said forward end has passed over and beyond the bars 46 into the position as shown at 47 in Fig. 1. It will be seen, therefore, that the forward end of each carrier plate as it passes underneath the hopper or receptacle 41 contacts with the outer or rear side or end of a package and pushes it from underneath the hopper or receptacle 41 and deposits it upon the adjacent preceding plate so that it is carried forward thereby. After the depending projections 45 have passed beyond the bars 46 the forward ends of the carrier plates drop down so that the forward ends thereof are in the same plane as that of the preceding plates. To insure that the plates shall be adjusted and positioned into alinement with each other so that the top surfaces thereof shall occupy substantially the same plane I have turned the forward ends of the guide plates 50 inwardly and downwardly, as indicated at 51, so that the opposite edges of the carrier plates 40 pass thereunder, as is shown in Fig. 7 of the drawings. The guide plates 50 are stationarily secured upon plates 52 and 53 which are situated adjacent the center and extend longitudinally of the machine. The inner edges of these plates are spaced from each other, as shown, the width of the said space being slightly less than the width of the carrier plates 40 so that as the latter travel through the machine their opposite edges rest upon the inner edges of the said plates 52 and 53. The outer portions of the guide plates 50 converge from their outer ends inwardly, as shown in Fig. 7 of the drawings, and operate to position the objects to be wrapped symmetrically with respect to the opposite side edges of the carrier plates 40. The guide plates 50, however, are situated far enough apart so as not to retard the forward movement of the objects to be wrapped which are supported upon the carrier plates.

As the objects to be wrapped are conveyed into the machine their rear ends are practically coincident or flush with the rear ends of the carrier plates on which they are supported and conveyed.

Figure 3:
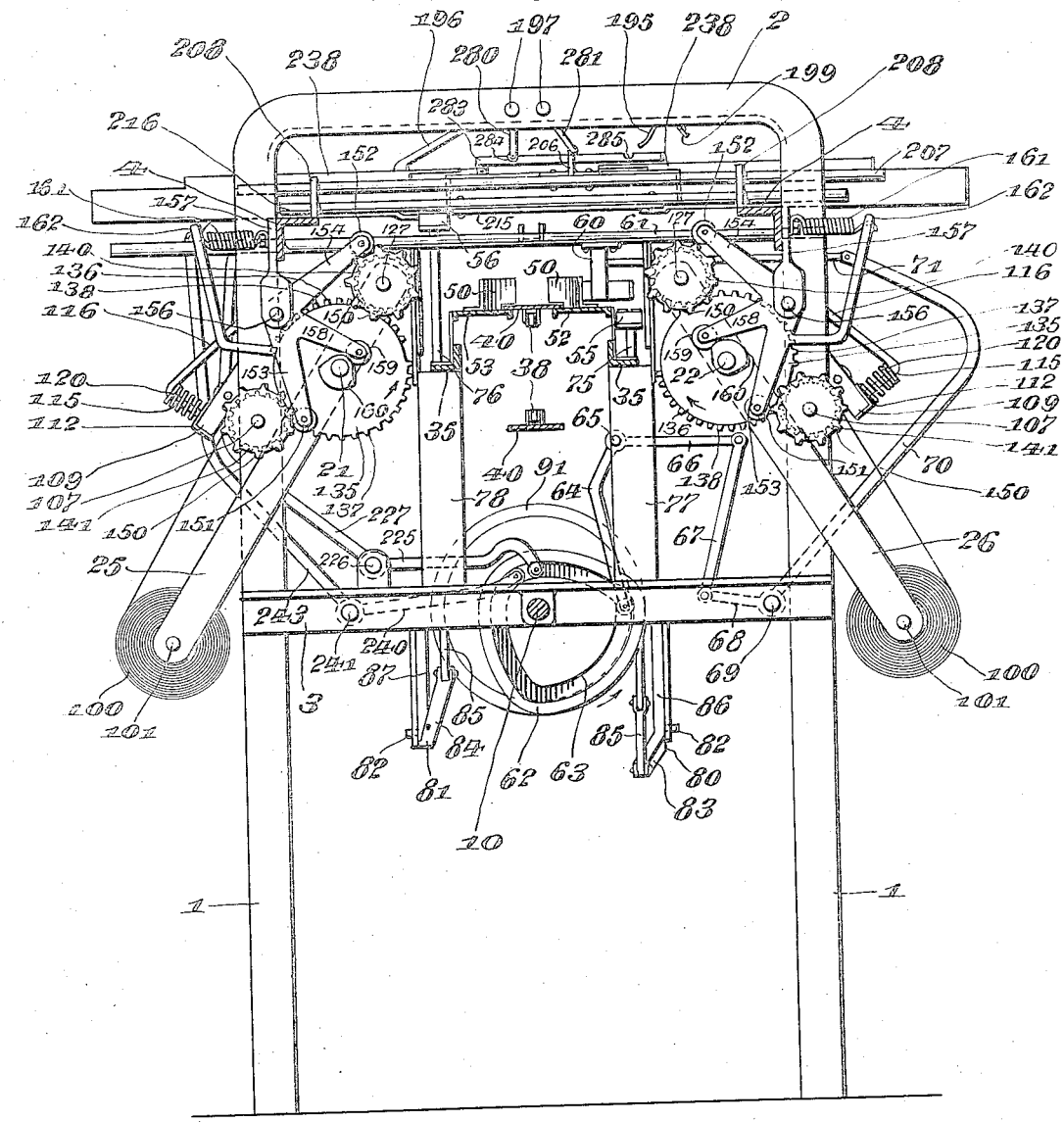
Fig. 3 is transverse sectional view taken on the line 3—3 of Fig. 1 showing one end of the frame and certain of the operative parts in elevation.

The objects to be wrapped are conveyed into the machine into positions intermediate two pairs of elevators 55 and 56; that is to say, one pair of said elevators is situated upon one side of the path of travel of the upper span of the conveyor and the carrier plates carried thereby while the other pair of elevators is situated upon the opposite side thereof. These elevators are automatically and alternately actuated for the purpose of elevating the objects to be wrapped which have been delivered thereto, as will be hereinafter described. Before proceeding, however, to describe the manner in which these elevators are actuated and operated I shall point out the manner in which the objects to be wrapped are delivered thereto. For effecting such delivery I have provided a pusher bar or plate 60 which is supported at its opposite ends upon bars or rods 61 which are slidably mounted in the downwardly extending flanges of the angle-bars or plates 4. To effect reciprocating movement of the pusher bar or plate 60; that is to say, movement thereof transversely and across the tops of the carrier plates 40, I have provided a cam wheel 62 secured to the rotatable main driving shaft 10, previously referred to. This wheel is provided with a cam groove 63 into which extends a projection from the lower end of an arm 64 secured at its upper end to a rock-shaft 65 to which is secured a laterally and substantially horizontally extending arm 66. The outer end of this arm is connected to the upper end of a link 67, the lower end of which is connected to the outer end of an arm 68 which extends inwardly and substantially horizontally from a rock-shaft 69 to which is secured the lower end of an arm 70, the upper end of which is pivotally secured to the outer end of a link 71, the inner end of which is secured in any suitable manner to the pusher bar or plate 60 heretofore referred to. In Fig. 3 of the drawings the pusher bar 60 is shown in position at the extreme end of its travel toward the right hand side of the machine (having reference to said figure). The pusher bar is of a length to remove two objects simultaneously from the conveyor onto elevators 55 or 56, as the case may be. During the time that the pusher bar is moving toward the right to transfer a couple of objects from the carrier plates of the conveyor or sprocket chains onto the elevators 55 and during a dwell of said pusher bar other objects are being conveyed forward into positions previously occupied by those just removed, and also during such period two objects previously transferred onto the elevators (56) at the opposite side of the machine have been elevated into position to be wrapped. When the said pusher bar is moved to the left the same operation as just described takes place.

To insure that the packages by reason of their momentum shall not pass beyond the elevators 55 or 56, as the case may be, I have provided the vertical abutment plates 72 situated adjacent the outer sides of the said elevators.

The elevators 55 and 56 are supported respectively upon U-shaped rods 75 and 76 which extend through openings in crossbars 77 and 78 and are guided thereby. Actuation; that is, alternate reciprocating vertical movements of the elevators and their supports is effected by bell crank levers 80 and 81 pivoted upon a stationary pivot 82. The inner ends of the arms 83 and 84 of the said levers are connected by means of links 85 to the U-shaped supporting members 75 and 76 while the upper ends of the other arms 86 and 87 of said levers are in engagement with a cam groove or slot 90 in the peripheral surface of a cam wheel or disk 91 mounted upon and rotating with the main driving shaft 10. The cam groove or slot 90 is so shaped and the upper ends of the arms 86 and 87 of the levers 80 and 81 are positioned therein upon opposite sides of the axis of the wheel or disk 91 so as to effect alternate upward and descending movements of the supports 75 and 76 and the elevators supported thereby. After the pusher bar or plate 60 has been moved into position to deposit a couple of objects to be wrapped upon a couple of elevators, say the elevators 55, it dwells or remains stationary for a period during which the main shaft 10 is making one quarter of a revolution. During the next period in which the main shaft is rotating through a quarter of a revolution the pusher bar moves in the opposite direction across the line of the conveyor into position to deposit two objects to be wrapped upon the opposite elevators 56. After having deposited the same upon these elevators the pusher bar dwells or remains stationary during the period while the main shaft 10 is rotating through a quarter of a revolution and so on during the operation of the machine.

In Fig. 3 the lower end of the arm 64 is shown in position reached by it just at the moment that the pusher 60 reaches the position in which it is shown in that figure, in which position the objects to be wrapped have just been deposited upon the elevators 55. For the next quarter of a revolution the cam groove 63 is concentric with the shaft 10 whereas during the next quarter of a revolution the cam is shaped so as to move the arm 64 inwardly toward the shaft. Such movement causes transverse movement of the bar 60 toward the left, having reference to Fig. 3. The next succeeding portion of the cam groove corresponding to a quarter of a revolution of the shaft 10 is concentric with the latter, while the remaining portion corresponding to a quarter revolution of the shaft is eccentric with respect thereto and operates to move the pusher bar 60 toward the right into the position in which it is shown in said Fig. 3.

In the case of butter and similar products it may be desired to place upon one of the surfaces thereof certain information, such as the name of the manufacturer, a trademark or other data, and to this end raised letters may be placed upon the top surfaces of the elevators 55, as indicated in Fig. 7a of the drawings. These letters being in the form of projections serve the further function of preventing or tending to prevent displacement of the butter or other package upon or over the elevator. In the performance of the latter function it is obvious that the projections need not be in the form of letters, as shown, but in the wrapping of packages of plastic or moldable material, such as butter, it may be found desirable to modify such projections in the form of letters for the purpose indicated.

The projections are caused to be embedded fully within the portion of the package resting on the elevator while the upper side of the package contacts with one side of a clamping member, to be hereinafter described.

During the period in which the objects to be wrapped are being placed upon the elevators sheets of wrapping paper are fed forward into position upon a platform or table 93 above the same so that as the elevators with the objects supported thereon are moved upwardly through openings 94 in said platform or table the said objects contact with the undersides of portions 95 of the said wrapper sheets and as the said objects continue their upward movement the opposite edge portions are folded downwardly upon opposite sides thereof, as indicated in Fig. 13 of the drawings at 96 and 97.

I shall now describe the mechanism for supplying and feeding the wrapper sheets into position within the machine for wrapping the objects which are to be wrapped. The wrapping paper is supplied to the machine in the form of rolls 100 which rolls are rotatably supported upon rods 101 which in turn are secured in the lower ends of the bracket plates 25 and 26. The mechanism for feeding the paper from the rolls and for severing portions 95 therefrom for wrapping the objects is the same for each roll of which there are four, two on each side of the machine; hence, in describing the same I shall refer to one group of such mechanism only and it will be understood that the mechanism of each other group is identical. In describing this mechanism reference will be made particularly to Figs. 3 and 5 from the latter of which it will be noted that the paper passes from the roll 100 upwardly between a couple of feed rolls 105 and 106. The former is secured upon a rotatable shaft or rod 107 supported in bearings in the legs of the frame of the machine while the latter is secured upon a rod 108 carried upon a frame 109 pivoted at its upper end upon a stationary rod 111. The frame 109, in the construction as shown, is of U-shape and the cross portion thereof is provided with a lug or ear at 112 through which the lower inwardly extending end 115 of an angular rod 116 extends. The opposite end of the said angular rod is secured to the transversely extending bar portion 117 of a U-shaped frame-like member 118 also pivoted upon the stationary rod 111. A coiled spring 120 is interposed between the lug or ear 112 and a collar or washer 121 upon the portion 115 of the angular rod 116. The said spring operates to press the roller 106 against the roller 105, and also tends to throw the upper end portions of the legs of the U-shaped frame member 118 beyond the rod 111 inwardly or downwardly so as to cause a roller 125 carried thereon to press yieldingly against a roller 126 secured to and rotatable with a rotatably supported rod or shaft 127. The rod or shaft 127 at one side of the machine is supported upon the upper ends of the bars 25 and at the other side upon the bars 26.

The shafts 107 and 127 are intermittently rotated. The mechanism for effecting such intermittent rotation comprises a couple of mutilated gear wheels 135 and 136 which, in the construction shown, are rigidly secured upon the shaft 21 in contact or in close relation with respect to each other, as shown in Fig. 7 of the drawings. Each of these gear wheels is provided with a single group of teeth 137 and 138 situated in relation to each other, as shown in Fig. 3 of the drawings. The remaining portions of the wheels 135 and 136 are smooth. The gear sections on the respective wheels occupy about two-fifths of the circumference thereof.

The teeth 137 are adapted to engage the teeth upon a gear pinion 140 secured upon the adjacent end of the shaft 127 while the gear teeth 138 upon the gear wheel 136 engage the gear pinion 141 secured upon the adjacent end of the shaft 107. It will be seen, therefore, that once during each revolution of the gear wheels 135 and 136 the gear sections 137 and 138 engage with the gear pinions 140 and 141 and effect rotation thereof. Such rotation obviously is effected intermittently or at intervals. The mutilated gear wheels 135 and 136 rotate in the direction of the arrows 145. It will be observed that the gear sections 137 and 138 are so positioned that the gear pinions 140 and 141 are simultaneously rotated. The rotation of these pinions is in a direction to effect feeding of the paper from the rolls 100 forwardy into the machine into position to wrap the articles intended to be wrapped. In order that at the completion of a period of rotation the pinions 140 and 141 shall be adjusted and held in position to properly register with the forward teeth of the gear sections 137 and 138 when the latter reach the said pinions I have provided adjusting and positioning means comprising sprocket-like or notched disks 150 which are rigidly secured to the shafts 107 and 127, adjacent the pinions 140 and 141, with which rollers 151 and 152 are adapted to engage. These rollers are mounted upon the outer ends of the arms 153 and 154 of an angular lever pivoted at 156 upon the lower end of a bracket 157 secured upon a stationary portion of the frame of the machine. For the purpose of actuating these arms 153 and 154 I have provided a third arm 158 which is provided with a roller 159 upon its outer end which is adapted to contact with and be actuated by a cam 160 secured to the shaft 21 adjacent the gear wheel 135 and rotating therewith. During the time that the gear pinions 140 and 141 are in engagement with the gear teeth 137 and 138 the high portion of the cam 160 is in engagement with the roller 159 so as to hold the rollers 151 and 152 out of contact with the notched disks 150. At the moment, however, that the gear segments 137 and 138 become disengaged from the gear pinions 140 and 141 the roller 159 passes on to the low portion of the cam so as to permit the spring 161 acting upon the arm 162 having connection with the arm 153 to throw the rollers 151 and 152 into contact with the notched edges of the disks 150 and the said rollers entering one of the notches on said disks positions and holds the said disks and the said gear pinions in such position that the latter register with the forward teeth of the gear segments as they again come into position to engage the teeth of said gear pinions. The paper from the roll 100 passes up between the rollers 105 and 106 and also betwen the rollers 125 and 126 so that as the rollers 105 and 106 and 125 and 126 are rotated intermittently they operate to feed the paper forward intermittently from the said roll 100. The paper is guided upwardly between outer guide members 165 and 166 and guide fingers 287, the former of which, 165 and 166, consist of angle-bars, as shown, the inner flanges of which constitute the guides and the outwardly extending flanges of which are spaced from each other so as to form an opening into which a cutting knife 170 projects in the operation of cutting sheets from the web of paper taken from the roll 100. The inner guide comprises the plates 171 and 172, the inner edges of which are spaced from each other, as shown, and through which the knife 170 projects in the cutting operation. The upper edge of the plate 172 terminates in adjacent relation to the upper surface of the feed roll 126. The paper as it is fed toward the wrapping position passes upwardly over and is supported by the plates 171 and 172. The forward end portion of the web of paper, before the wrapping operation, is severed and is conveyed or fed forward by the rollers 125 and 126 into position above the elevators 55 or 56, as the case may be. Prior to severing the said sheets its forward end has been engaged by the rollers 125 and 126.

Stops 286 are provided against which the forward ends of the sheets of paper, as they are fed into the machine, contact, the said sheets being thereby accurately positioned with respect to the objects to be wrapped thereby.

There are two of these knives at each side of the machine situated respectively in opposed relation to the paths of travel of the webs of paper upwardly into the machine. The respective couples of knives are supported upon a bar 180 which in turn is supported upon the depending arms 181 which are pivotally suspended from the shaft 127. The lower ends of the suspended pivotally supported arms 181 are bent inwardly and upwardly, as indicated at 183, and are provided at their ends with rollers 184 which are in engagement with cams 185 upon the shaft 21 upon one side of the machine and 22 upon the other. When the rollers 184 are in contact with the high portions of the cams 185 the pivot arms 181 are held inwardly so as to withdraw the knives supported upon the bar 180 away from or out of the path of travel of the web of paper to be severed. However, upon release of the rollers 184 from the high portions of the said cams the said rollers drop suddenly on to the low portions of the said cams and permit coiled springs 188, each of which is connected at one end to one of the pivoted swinging supports 181 and at its opposite end to the angle member 165, to snap the said pivoted swinging supporting members 181 forward so as to cause the knives carried by the bar 180 to sever the web of paper 100 at a point intermediate the rollers 105 and 106 and 125 and 126. The severed portion of the web, as already stated, is carried forward by the rollers 125 and 126 into position above the elevators 55 or 56, as the case may be. The elevators, as has been described already, are alternately elevated and lowered. In Figs. 5 and 6 the elevators 56 are in elevated position while the elevators 55 are in lowered position. In moving upwardly to the position shown in Fig. 6 the articles to be wrapped which are supported upon the tops of the said elevators contact with the under side of the severed wrapper sheets and the middle and opposite end portions thereof are folded around the said article in the manner as indicated in Fig. 13 of the drawings, the enfolding portions of the sheet comprising the central portion and the side portions, 96 and 97.

As the packages to be wrapped are elevated they contact with one side 195 of an angular holding or clamping member pivoted upon the outer end of a U-shaped arm 196 supported at its inner end upon a rocking bar 197 journaled at its opposite ends in the top cross-bars of the ends of the main frame. The opposite side 199 of the said clamping member is supported upon a spring 200. The contact of the upper side of a package or object 201 with the side 195 of the clamping member causes pivotal movement of said member so as to cause pressure of the yielding spring supported side 199 against the outer side of the said package or object to clamp the same against the outer side of a flange 205 upon a pusher member 206 supported at its opposite ends upon rods 207 which are slidably supported in bearings upon the vertical flanges upon angle members 208. As the side 195 of the angular holding member is pushed up by the package or object it passes beyond the upper end of a spring catch 210 which is secured upon the pusher member 206 and the end thereof engages with the under side of said side 195 so as to hold the said clamping member in clamping position. Immediately after the said package has been clamped by the said clamping member one of the elevators 55 or 56, as the case may be, descends, but the package is held in place by the clamping member as above indicated. While so held a tucker member 215 is actuated to tuck the lower edge portion of the adjacent side of the wrapper underneath the bottom of the package, as indicated in Fig. 14 of the drawings. The said tucker member 215 is supported at its opposite ends upon rods 216 slidably supported at their opposite ends in holes in the vertical flanges of the angle-bars 208. The opposite edges of the tucker member 215 operate to tuck or fold the lower edge portions of the adjacent sides of the wrappers for the packages being wrapped,—one edge of the said tucker operating to tuck or fold the edges of the wrappers for two packages upon the same side of the machine simultaneously while the opposite edge, when the tucker is moved in the opposite direction or to the opposite side of the machine, operates in like manner to tuck or fold simultaneously the lower edge portions of the adjacent sides of the wrappers for two other packages upon the said opposite side of the machine. In the construction shown the tucker comprises a single plate which extends transversely of the machine although it will be understood that this arrangement may be changed if desired. The essential thing is that the tucker mechanism shall be of a character to simultaneously and alternately tuck or fold the edges of the wrappers of two packages upon opposite sides of the machine.

The means for operating the tucker comprises an arm 225 secured at one end to a rock shaft 226. The opposite end of the said arm is provided with a roller or projection which enters the cam groove 63, previously referred to. Rotation of the cam wheel in which the said groove is situated effects movement of the said arm to cause pivotal or rocking movement of the rod or shaft 226. An arm or lever 227 is also secured to the said shaft and extends upwardly as shown. The upper end of said arm or lever 227 is pivotally connected with a link 228, the inner end of which is connected to a lug or ear 229 upon the tucker 215. It will be seen that as the cam wheel 62 rotates the arm or lever 227 is oscillated to effect reciprocating movements of the pusher 206 transversely of the machine. In Fig. 5 of the drawings the right hand edge of the tucker plate 215 is shown in the position occupied by it when it is in a tucking position; that is, in position immediately after the lower edge portions of the adjacent sides of the wrappers have been tucked underneath a couple of packages, as already described. It will be observed that at such time the left hand edge, as shown in said Fig. 5, is to the right hand side of the package at the left hand side of the machine which has been moved into position by the elevators 56 ready to be wrapped. Immediately following the descending movement of the elevators 56 the tucker 215 is moved toward the left to tuck or fold the lower edge portions of the adjacent sides of wrappers underneath the packages on the left hand side of the machine and so on during the operation of the machine.

Slightly following but almost simultaneously with the folding of the lower edge portions of the sides underneath the objects to be wrapped, as shown in Fig. 14 of the drawings, the projections 235 adjacent the opposite edges of the respective tuckers which projections are arranged in operative relation to the front ends of folding chutes 238, engage the opposite ends of the adjacent sides of the wrapper to fold the same inwardly, as shown at 239 in Fig. 15. In the operation of the machine, the tuckers move forward to effect the bending or folding of the lower edge portions of the adjacent sides of the wrapper before movement of the pusher 206 begins.

For the purpose of operating the pusher 206 and causing reciprocating movements thereof across the machine from one side to the other I have provided an arm 240, the outer end of which is secured to a rock-shaft 241 pivotally supported in the cross-bars 3 at the opposite ends of the machine. The inner end of the said arm 240 is provided with a roller or projection situated within the cam groove 63 of the cam wheel 62. The said rock-shaft 241 is also provided with an upwardly extending arm 243 the upper end of which is extended inwardly and has pivotal connection with a link 244 the inner end of which is pivotally connected with the pusher, as indicated at 245. The cam wheel 62 rotates in an anti-clockwise direction (having reference to Figs. 3 and 5 of the drawings) or in the direction of the arrows shown in said figures, in consequence of which actuation of the lever arm 225 is effected immediately preceding the actuation of the lever arm 240. It follows, therefore, that the movements or actuations of the tucker 215 slightly proceeds the movements or actuations of the pusher 206.

As already indicated, the forward edge of the tucker plate or plates operates to fold or bend the lower edge portions of the adjacent sides of the wrappers underneath the objects and that almost simultaneously with such folding the adjacent end portions of the wrapper are folded inwardly, as indicated at 239 in Fig. 15 of the drawings. Immediately following this action the pusher begins to move forward so as to push the packages forward off of the adjacent outer edge portions of the tucker plate into the folding chutes 238. The bottoms of these folding chutes at their inner ends, as indicated at 260, are slightly depressed so that when the edge of the tucker plate passes over the same it will form with the adjacent elevated portions of the bottoms of said chutes a smooth surface whereby the packages may be readily slid from the tucker on to the bottoms of the said chutes. Each of the said chutes is provided with folding strips 261 supported at their inner ends upon their sides, as indicated at 262. The outer or forward ends of these folding strips are yielding so that they may readily slide over the opposite ends of the packages as they are pushed through the folding chutes. As the packages are pushed forward by the pusher the lower edge portions of the outer sides of the wrappers are folded inwardly, as indicated at 263 in Fig. 16 of the drawings, so as to overlap the edge of the previously folded edge portion of the opposite side. Such folding is effected by the inner edges of the bottoms of the chutes. Almost simultaneously with the folding of such edges the opposite ends of the outer or forward sides are folded inwardly, as indicated at 265, by means of the folding strips 261. The lower edge portions of the sides and the opposite ends thereof having been folded in the manner as indicated in Figs. 14 to 17 inclusive it then becomes necessary to fold the lower and upper angular end portions of the tops and bottoms of the wrappers upwardly and downwardly. Each of the chute members 238 is provided at its opposite sides and upon its inner end portion with means for effecting the upward and downward folding of these angular end portions into the positions indicated in Fig. 19 of the drawings. The lower angular portions 266 are first folded upwardly and such upward folding is effected by inclining the opposite edges of the bottom upwardly as indicated at 267. The inclination of such upwardly inclined portion begins at a point practically coincident with the shoulder at the inner edge of the depressed portion 260 of the bottom of the said chute. The forward ends of the inclined portions 267 terminate in vertical portions, as indicated at 270. For the purpose of bending the upper angular portions 271 of the wrappers downwardly the opposite edges of the top portions of the chutes are provided with downwardly inclined portions at their opposite sides, as indicated at 272. These downwardly inclined portions 272 begin at a point a distance from the inner ends of the said chutes, as indicated at 273. At their outer or forward ends these inclined portions 272 merge into the opposite vertical sides 274 of the said chute. The outer ends of the inclined portions 267 are slightly spaced from the outer ends of the inclined portions 272 and terminate at points opposite those at which the portions merge into the sides 274. By reason of the relative arrangement of the parts 267 and 272 the upper angular portions 271 are folded downwardly over the upper ends of the angular portions 266. As each package is pushed into its folding chute it contacts with the rear or inner side of the last preceding wrapped package and pushes it forward.

I have not shown any means for conveying the wrapped packages from the machine, but it will be understood that if desired means may be provided for conveying the packages from the chutes to any desired designation.

To insure that the articles or objects to be wrapped shall be discharged from the conveyor on to the elevators 55 or 56 at points in alinement with the folding chutes 238 I have provided projections 275 and 276 upon the opposite sides of the pusher bar or plate 60, the latter of which are situated at or near the forward end of the said pusher bar or plate while the others, 275, are situated at points intermediate the ends thereof. These projections constitute stops to limit the forward movement of the articles or objects upon the carrier. In the operation of the apparatus these stops move into position directly in front of the forward ends of said articles or objects so that forward traveling movement thereof is limited by the contact of the forward ends therewith. This insures that the objects or articles shall be delivered in proper position upon the elevators and in alinement with the folder chutes upon the opposite sides of the machine.

It will be understood that the distances of the stops from each other, the distances of the stops 275 from the rear or left hand end of the pusher bar or plate 60 (having reference to Fig. 8 of the drawings) and also that the dimensions of the elevator platforms 55 and 56 may be varied to accommodate packages of different or varying sizes.

Reference has been made already to the angular clamping means for holding the packages during the interval immediately following the descending movements of the elevators 55 or 56 and before and while the tucker is moving forward to fold the lower edge portions of the adjacent sides underneath the package. Simultaneously, however, with the beginning of the forward movement of the pusher 206 to transfer the package or packages from the upper edge portion of the tucker forwardly into the folding chutes the U-shaped members 196 upon the outer ends of which the clamping means comprising the sides 195 and 200 are supported are elevated to release the said angular clamping and holding means. The U-shaped members 196 at the opposite sides of the machine are supported upon the parallel bars or shafts 197, as shown in the drawings. For rocking the bars or shafts 197, to actuate the U-shaped arms 196 I have provided depending arms 280 and 281, one arm for each bar or shaft, the lower ends of which are adapted to contact with a rib 283 upon the upper side of the pusher member 206. The said rib extends transversely of the shafts 197 and in the direction of the reciprocating movements of the said pusher member. The said rib is provided near its opposite ends with notches 284 and 285 with which the lower ends of the depending arms 280 and 281 are adapted to engage. As is apparent the rib 283 slides back and forth underneath the lower ends of the arms 280 and 281. When the pusher member 206 is in the position as shown in Fig. 5 it will be seen that the lower end of the arm 280 is in engagement with the notch 284 and that the U-shaped arm 196 upon the left hand shaft 197 extends downwardly with the clamping member carried thereby in clamping engagement with a package to be wrapped so that when the elevator or elevators 55 descend the said package will remain in position. The clamping members at the opposite sides of the machine are at such time in elevated position, as is shown in said Fig. 5. Upon movement of the pusher member toward the left (which movement follows or lags behind corresponding movement of the tucker 215) the arm 280 is turned toward the left by reason of its engagement with the notch 284 so that the left hand supports 196, shown in Fig. 5, are elevated to disengage the clamping members carried thereby from the packages to permit the same to be pushed forward by the pusher. As the pusher begins its movement toward the left the lower end of the arm 281 enters the notch 285 so that the arms carrying the clamping members at the right hand side of the machine, as shown in Fig. 5, descend into position such that the said clamping members engage with the package to hold the same, as has been described already in connection with the packages or objects to be wrapped at the opposite side of the machine.

The operation of the machine may be described in a general way as follows:

The articles or objects to be wrapped are delivered on to the carrier plates or supporting platforms of the endless carrier and are conveyed thereby into the machine. The movement of the said conveyor is so timed that two of the said platforms or carrier plates move into positions opposite the pusher member 60 while it occupies a position at one side of the machine, as shown for instance in Fig. 3 of the drawings. When the said two objects have reached such positions the said pusher is operated so as to move across the machine removing the said objects from the said carrier plates or platforms on to one of the two pairs of elevators provided for the elevation or lifting of the same into position to be wrapped by the wrapping mechanism. These elevators are arranged in pairs, as has been described already, the said pairs being situated in opposed relation to each other upon opposite sides of the conveyor. These elevators move in opposite directions; that is to say, as one pair of elevators moves upwardly the other pair moves downwardly. This also is indicated in Fig. 3 of the drawings. It may be noted here that during the period when a pair of elevators occupies its lowermost position wrapping sheets are moved into position above such pair of elevators so that as the same are elevated the said wrappers are folded over the top and about the opposite sides of the articles or objects thereon, as has been described. When a pair of elevators has moved upwardly a sufficient height to carry the objects to be wrapped into positions in alinement with the inner ends of the folder chutes 240, previously referred to, they are clamped and held in such position by the clamping means comprising the sides 195 and 199 which clamp the said articles or objects against the adjacent edge or end of the pusher member 206. The said elevators then descend and the tucker 215 then moves forward and operates to fold the lower edge portions of the adjacent sides of the wrappers underneath the objects. Immediately thereafter the pusher follows along and pushes the said objects into the folder chutes to effect folding of the remaining portions of the wrappers about the said objects, as has been hereinbefore fully pointed out and described.

Having thus described my invention what I claim and desire to secure by Letters Patent is:

1. In a wrapping machine, the combination of a conveyor for conveying objects to be wrapped into said machine, means for removing two subjects simultaneously from the said conveyor alternately in opposite directions, and means for thereafter simultaneously wrapping both objects of each couple so removed from said conveyor.

2. In a wrapping machine, the combination of a conveyor for conveying objects to be wrapped into said machine, a reciprocating member movable transversely of the said conveyor and adapted to remove therefrom simultaneously two objects alternately in opposite directions, wrapping means, and means for conveying two objects to be wrapped simultaneously to said wrapping means, the said means being adapted to simultaneously wrap the said objects.

3. In a wrapping machine, the combination of a conveyor for conveying objects to be wrapped into said machine, reciprocating means movable transversely of and above the said conveyor for removing simultaneously two objects therefrom alternately in opposite directions, pairs of elevators situated upon opposite sides of said conveyor for receiving said objects, means for causing reciprocating vertical movements of said elevators, wrapping means, and means for conveying the objects to be wrapped from said elevators to said wrapping means.

4. In a wrapping machine, the combination of a conveyor for conveying objects to be wrapped into said machine, a member arranged in parallel relation to the top portion of said conveyor and extending longitudinally of the said conveyor, means for causing reciprocation of said member transversely of the said conveyor to remove pairs of objects to be wrapped from said conveyor alternately in opposite directions, elevators situated upon opposite sides of said conveyor for receiving said objects, means for causing vertical reciprocating movements of said elevators, means for clamping the said objects to be wrapped when they have been elevated by the said elevators and holding the same after descending movement of said elevators, wrapping means, and means for conveying the said objects to said wrapping means.

5. In a wrapping machine, the combination of a conveyor having pivotally supported carrier plates for receiving and conveying the objects to be wrapped into said machine, means for simultaneously removing two objects from said conveyor, the said pairs of objects being transferred from said carrier plates alternately in opposite directions, elevating means situated upon opposite sides of said conveyor for receiving the said objects, means for elevating and lowering the said elevating means, means for engaging and holding the objects to be wrapped after they have been elevated by the said elevating means to thereby permit the said elevating means to descend from the said objects, wrapping means, and means for transferring the said objects to said wrapping means.

6. In a wrapping machine, the combination of a conveyor for conveying objects to be wrapped into said machine, means for simultaneously discharging a couple of adjacently situated objects from said conveyor, the said couple of objects being discharged alternately in opposite directions, pairs of elevating means situated upon opposite sides of said conveyor on to which the said objects are adapted to be placed, means for supplying sheets of wrapping paper above the said elevating means and in the line of movement thereof, means for effecting vertical up and down movements of the said elevating means to engage the objects to be wrapped with the said wrapping paper, means for engaging and holding the said objects when they have been elevated by the said elevating means, wrapping means, and means for conveying the said objects to said wrapping means.

7. In a wrapping machine, the combination of a conveyor for conveying objects to be wrapped into said machine, a member for transferring said objects from the said conveyor alternately in opposite directions, elevators for receiving said objects, one pair of elevators being situated upon one side of said conveyor and another pair upon the opposite side thereof, means for depositing wrapping sheets in position over the said elevators, means for effecting alternate upward and downward movements of the said pairs of elevators, the said wrapping sheets being folded over the top and about the sides of the objects to be wrapped as the elevators are raised, clamping means for engaging and holding the said objects when they have been elevated to their highest position, said clamping means comprising a pusher member and a pivotally supported member, a tucker, means for causing reciprocating movement of the said tucker, to project the opposite ends thereof underneath the objects to be wrapped and to fold adjacent portions of the wrappers underneath said objects, means for actuating said pusher for pushing the said objects outwardly from the said machine, and wrapping chutes for receiving said objects, said chutes having mean for completing the wrapping operation.

8. In a wrapping machine, the combination of a conveyor for conveying objects to be wrapped into the said machine, means for removing the said objects from said conveyor alternately in opposite directions, means for marking the said objects, and means for thereafter wrapping the same.

9. In a wrapping machine, the combination of a conveyor adapted to convey objects to be wrapped into said machine, a transversely reciprocating member for removing the said objects from said conveyor, wrapping means at opposite sides of said machine, and means upon the opposite sides of said conveyor which means is adapted to be operated alternately to convey the objects to be wrapped to said wrapping means.

10. In a wrapping machine, the combination of a conveyor for conveying objects to be wrapped into said machine, means for simultaneously removing a plurality of objects from said conveyor, said removals being effected alternately in opposite directions, elevators for receiving the said objects, means for actuating the said elevators to cause vertical reciprocating movements thereof, the movements of the elevators upon opposite sides of the conveyor being effected simultaneously in opposite directions, means for receiving and holding the said objects when they have reached their highest position, a pusher, each opposite end of which constitutes one element of the said holding means, a tucker, the opposite ends of which are adapted to be projected underneath the lower sides of the said objects to be wrapped, means for actuating the said tucker alternately in opposite directions, means for actuating the said pusher alternately in opposite directions and for simultaneously releasing the objects to be wrapped, and means for effecting wrapping of said objects.

11. In a wrapping machine, the combination of a conveyor for conveying objects to be wrapped into said machine, a driving shaft, wrapping means at the opposite sides of the said machine, a plurality of independently actuated but co-operating devices for transferring the said objects alternately in opposite directions to the said wrapping means, and means intermediate the said driving shaft and the said independently actuated devices for actuating the latter.

12. In a wrapping machine, the combination of a conveyor for conveying objects to be wrapped into the said machine, wrapping chutes, transversely and vertically moving means upon opposite sides of said conveyor for transferring the said objects from the said conveyor to positions in alinement with the said chutes, and means for projecting the said objects in opposite directions into the said chutes.

13. In a wrapping machine, the combination of a conveyor for conveying objects to be wrapped into the said machine, wrapping means on opposite sides of said machine, means for supplying wrapping sheets to said machine, the said sheets being deposited at points intermediate the said objects and the said wrapping means, horizontally and vertically moving means for transferring the said objects alternately in opposite directions from said conveyor to the said wrapping means, the said wrapping sheets being automatically partially folded around the said objects as the same are moved to the said wrapping means.

14. In a wrapping machine, the combination of a conveyor for conveying objects to be wrapped into said machine, a horizontally moving reciprocating member for discharging the said objects alternately in opposite directions from said conveyor, alternately vertically reciprocating members for receiving said objects and elevating the same, a pusher, the opposite ends of which are adapted to contact with the inner sides of the objects upon the opposite sides of the machine to push the same outwardly into said chutes, pivotally supported clamping devices for engaging the outer and the top sides of the said objects for holding the same after the said vertically moving means have descended from the said objects, and wrapping chutes into which the said objects are adapted to be pushed by the said pusher.

15. In a wrapping machine, the combination of a conveyor for conveying objects to be wrapped into the said machine, wrapping mechanism, means for feeding wrapping paper into position between the said wrapping means and the said conveyor, means for severing portions of said paper to form wrapping sheets, means for discharging the said objects laterally and alternately in opposite directions from the said conveyor, and means for conveying the same vertically to the said wrapping means, the said wrapping sheets being automatically partially folded around the said objects in their upward movement to the said wrapping means.

16. In a wrapping machine, the combination of a conveyor for conveying objects to be wrapped into said machine, means for discharging the said objects laterally and alternately in opposite directions from said conveyor, means for receiving and supporting the said objects when they are discharged from the said conveyor, means for feeding wrapping paper into the said machine into positions over the said objects, means for severing portions thereof to form wrapping sheets, means for effecting vertical movement of the said supporting means on opposite sides of the said conveyor to transfer the said objects upwardly and to effect partial wrapping of the said wrapping sheets around the same, and means for thereafter completing the folding of the said wrapping sheets around the said objects.

17. In a wrapping machine, the combination of a conveyor for conveying objects to be wrapped into said machine, wrapping chutes, a pusher for projecting the said objects into said wrapping chutes, horizontally and vertically reciprocating means for transferring the said objects from said conveyor to positions intermediate one or the other of the ends of said pusher and the adjacent end of a chute, clamping means adapted to co-act with the said pusher for clamping and holding the said objects in position, rock-shafts for supporting the said clamping means, and means intermediate the said rock-shafts and the said pusher whereby reciprocating movement of the latter effects rocking movements of the said rock-shafts and the said clamping means.

18. In a wrapping machine, the combination of a conveyor for conveying objects to be wrapped into said machine, horizontally reciprocating means for discharging the said objects alternately in opposite directions from said conveyor, elevators situated upon opposite sides of said conveyor for receiving and supporting said objects, the said elevators being provided with marking means for marking the said objects, means for effecting vertical reciprocating movements of the said elevators, means for conveying wrapping sheets into position above the said elevators whereby the said wrapping sheets are adapted to be engaged by the said objects as the latter are moved upwardly, means for clamping and holding the said objects after they have been elevated to their uppermost positions by the said elevators, and means for thereafter completing the wrapping of the said wrapping sheets around the said objects.

19. In a wrapping machine, the combination of a conveyor adapted to convey objects to be wrapped into said machine, means for removing said objects from said conveyor, wrapping means at opposite sides of said machine, and means upon opposite sides of said conveyor adapted to be operated alternately to convey the objects to be wrapped to said wrapping means.

In testimony that I claim the foregoing as my invention, I have hereunto signed my name this 23rd day of January, A. D., 1923.

GEORGE D. RATLIFF.